United States Patent
Kim et al.

(10) Patent No.: US 10,071,637 B2
(45) Date of Patent: Sep. 11, 2018

(54) PULSE WIDTH MODULATION RESONANCE CONVERTER AND CHARGER FOR VEHICLE USING THE SAME

(71) Applicants: Hyundai Motor Company, Seoul (KR); Myongi University Industry and Academia Cooperation Foundation, Yongin, Gyeonggi-Do (KR); Kia Motors Corporation, Seoul (KR)

(72) Inventors: Jong Pil Kim, Gyeonggi-Do (KR); Seok Joon Kim, Gyeonggi-Do (KR); Sam Gyun Kim, Gyeonggi-Do (KR); Woo Young Lee, Chungcheongbuk-do (KR); June Young Lee, Gyeonngi-Do (KR); Byung Kwon Lee, Chungcheongnam-Do (KR)

(73) Assignees: Hyundai Motor Company, Seoul (KR); Myongji University Industry and Academia Cooperation Foundation, Yongin, Gyeonggi-do (KR); Kia Motors Corporation, Seoul (KR)

( * ) Notice: Subject to any disclaimer, the term of this patent is extended or adjusted under 35 U.S.C. 154(b) by 540 days.

(21) Appl. No.: 14/542,624

(22) Filed: Nov. 16, 2014

(65) Prior Publication Data
US 2016/0001665 A1    Jan. 7, 2016

(30) Foreign Application Priority Data
Jul. 4, 2014   (KR) .................. 10-2014-0083556

(51) Int. Cl.
*H02J 7/04* (2006.01)
*B60L 11/18* (2006.01)
(Continued)

(52) U.S. Cl.
CPC ........... *B60L 11/1809* (2013.01); *H02J 7/022* (2013.01); *H02M 3/337* (2013.01); *H02M 3/33507* (2013.01)

(58) Field of Classification Search
CPC .................................................. B60L 11/1809
(Continued)

(56) References Cited

U.S. PATENT DOCUMENTS 7,843,708 B2    11/2010  Seong
2011/0038180 A1  2/2011  Yang
(Continued)

FOREIGN PATENT DOCUMENTS

CN    101719728 A    6/2010
CN    102347695 A    2/2012
(Continued)

OTHER PUBLICATIONS

European Search Report for European Patent Application No. 14194170.8, dated Feb. 15, 2016, 11 pages.
(Continued)

*Primary Examiner* — Richard V Muralidar
(74) *Attorney, Agent, or Firm* — Mintz Levin Cohn Ferris Glovsky and Popeo, P.C.; Peter F. Corless (57) ABSTRACT

A pulse width modulation resonance converter is provided that includes a transformer and a switching unit including first to fourth switches electrically connected to a primary coil of the transformer and configured to convert a DC voltage into an AC voltage by a switching operation of the first to fourth switches in which each switch is switched from an off state to an on state when a voltage difference between both ends is about 0. Additionally, a rectifying unit includes an output capacitor, first to fourth diodes electrically connected to a secondary coil of the transformer, and a resonance tank having a resonance capacitor and a reso-
(Continued)

nance inductor which are electrically connected to the secondary coil of the transformer. The plurality of switches connected to the primary side of the transformer perform the zero-voltage switching using the magnetized inductance of the primary side to minimize the switching loss.

9 Claims, 12 Drawing Sheets (51) Int. Cl.
    *H02M 3/337*  (2006.01)
    *H02M 3/335*  (2006.01)
    *H02J 7/02*   (2016.01)
(58) Field of Classification Search
    USPC .......................................................... 320/109
    See application file for complete search history.

(56) References Cited

U.S. PATENT DOCUMENTS

| | | | |
|---|---|---|---|
| 2011/0234187 A1 | 9/2011 | Brown et al. | |
| 2011/0249472 A1 | 10/2011 | Jain et al. | |
| 2012/0008359 A1 | 1/2012 | Greenfeld | |
| 2013/0026975 A1 | 1/2013 | Liu et al. | |
| 2013/0119932 A1* | 5/2013 | Moon | B60L 11/1816 320/109 |
| 2014/0049219 A1* | 2/2014 | Lee | H02J 7/022 320/109 |
| 2014/0153289 A1* | 6/2014 | Kao | H02M 3/3376 363/17 |

FOREIGN PATENT DOCUMENTS

| | | |
|---|---|---|
| CN | 102376246 A | 3/2012 |
| CN | 102983610 A | 3/2013 |
| DE | 102012016928 A1 | 3/2013 |
| EP | 1458084 A2 | 9/2004 |
| JP | 11-089232 A | 3/1999 |
| JP | 3674283 B2 | 7/2005 |
| JP | 2014-079145 A | 5/2014 |
| KR | 10-1000561 | 12/2010 |

OTHER PUBLICATIONS

Yun, Suyoung et al., "EV On-board Battery Charger with Wide input range & Film Capacitor", The Korean Institute of Power Electronics, Conference 2011, pp. 155-156 (Jul. 2011), English abstract.

European Search Report for European Patent Application No. 14194170.8, dated Nov. 9, 2015, 5 pages.

* cited by examiner

PULSE WIDTH MODULATION RESONANCE CONVERTER AND CHARGER FOR VEHICLE USING THE SAME

CROSS-REFERENCE TO RELATED APPLICATION

This application claims priority to and the benefit of Korean Patent Application No. 10-2014-0083556 filed in the Korean Intellectual Property Office on Jul. 4, 2014, the entire contents of which are incorporated herein by reference.

BACKGROUND (a) Field of the Invention

The present invention relates to a pulse width modulation resonance converter and a charger for a vehicle using the same.

(b) Description of the Related Art

Recently, since chargers mounted within an electric vehicle (hereinafter, referred to as an 'EV') which rapidly rises in demand and a plug-in hybrid type vehicle are important components which are directly connected to fuel efficiency of the vehicle, the demand for high efficiency has increased. Since a vehicle mounted type charger uses commercial power as an input, the commercial power needs to be used in an input voltage range of about 90 Vrms to 265 Vrms, needs to have power-factor improvement, and needs to correspond to a charging voltage in a wide range of about 250 V to 450 V according to a battery specification.

In order to satisfy the requirements, a converter for EV charging is configured by two steps of a power factor correction (PFC) boost converter (hereinafter, referred to as a PFC converter), which is an alternating current-direct current (AC/DC) converter for power-factor improvement and a DC/DC converter configured to convert a DC voltage output from the PFC converter into a battery charging voltage. Among the converters, the DC/DC converter uses an insulation type transformer for insulation, and the insulation type DC/DC converter has a substantial effect on efficiency of the charger.

For the DC/DC converter for the commercialized EV charger, a phase shift full bridge (hereinafter, referred to as a 'PSFB') type converter is mainly used, and in the PSFB type converter, soft switching may be difficult at a substantially low load, an excessive internal voltage is applied to a rectified terminal of a secondary side to use an element having a substantial conduction loss, and a snubber for reducing voltage surge is required. As a result, for the PSFB type converter, it may be difficult that efficiency at a maximum load exceeds about 92%.

The above information disclosed in this section is merely for enhancement of understanding of the background of the invention and therefore it may contain information that does not form the prior art that is already known in this country to a person of ordinary skill in the art.

SUMMARY

The present invention provides a pulse width modulation resonance converter that reduces an internal voltage of a secondary diode and switches a zero-voltage regardless of a load, and a charger for a vehicle using the same.

An exemplary embodiment of the present invention provides a pulse width modulation resonance converter that may include: a transformer; a switching unit including first to fourth switches electrically connected to a primary coil of the transformer and may be configured to convert a DC voltage into an AC voltage by a switching operation of the first to fourth switches in which each switch may be switched from an off state to an on state when a voltage difference between both ends is about 0; and a rectifying unit including an output capacitor, first to fourth diodes electrically connected to a secondary coil of the transformer, and a resonance tank having a resonance capacitor and a resonance inductor electrically connected to the secondary coil of the transformer.

In particular, one end of the secondary coil of the transformer may be electrically connected to a contact point of the first and second diodes, the resonance tank may be electrically connected between the other end of the secondary coil of the transformer and a contact point of the third and fourth diodes, and the output capacitor may be electrically connected between the contact point of the first and fourth diodes and the contact point of the second and third diodes.

Further, one end (e.g., a first end) of the primary coil of the transformer may be electrically connected to a contact point of the first and second switches connected to each other in series, and the other end (e.g., a second end) of the primary coil of the transformer may be electrically connected to a contact point of the third and fourth switches connected to each other in series. In addition, an input capacitor may be electrically connected between the first switch and the second switch.

Another exemplary embodiment of the present invention provides a charger for a vehicle configured to charge a high voltage battery supplying power to a motor generator of the vehicle and a low voltage battery supplying the power to an electric field of the vehicle, the charger may include: an AC/DC converter configured to convert an input AC voltage into a DC voltage; a first converter including a plurality of switches formed at a primary side of a transformer, and a resonance inductor and a resonance capacitor formed at a secondary side of the transformer, and configured to generate a first voltage for charging the high voltage battery by adjusting a level of a DC voltage output from the AC/DC converter; and a low voltage supply unit configured to generate a second voltage for charging the low voltage battery by setting an output voltage of the first converter or an output voltage of the high voltage battery as a first fixed voltage and stepping-down the output voltage based on the first fixed voltage.

In particular, the low voltage supply unit may include a fixed voltage generator configured to maintain the output voltage of the first converter or the output voltage of the high voltage battery by the first fixed voltage, and a low voltage DC/DC converter configured to charge the low voltage battery by the second voltage, after converting the first fixed voltage output from the fixed voltage generator into the second voltage by adjusting a duty ratio. In addition, the fixed voltage generator may include a first switch electrically connected to an output terminal of the first converter and one end (e.g., a first end) of the high voltage battery, a diode electrically connected to the first switch and the other end (e.g., a second end) of the high voltage battery, and an inductor electrically connected to the output terminal of the first converter and one end of the high voltage battery.

In a first mode in which the high voltage battery may be charged, the first switch may be in an on state, and in a second mode in which the low voltage battery may be charged, the first switch, the diode, and the inductor may be configured to operate as a buck DC/DC converter. Further, the fixed voltage generator may further include a second switch connected to the first switch in parallel and electrically connected to the output terminal of the first converter and one end of the high voltage battery. In particular, in the first mode in which the high voltage battery may be charged, the second switch may be in an on state, and in the second mode in which the low voltage battery may be charged, the second switch may be in an off state, and the first switch, the diode, and the inductor may be configured to operate as a buck DC/DC converter.

Meanwhile, the low voltage supply unit may be configured to maintain the first fixed voltage based on the output voltage of the first converter while the vehicle is stopped, and maintain the first fixed voltage based on the output voltage of the high voltage battery while the vehicle is traveling. The pulse width modulation (PWM) resonance converter according to the exemplary embodiments of the present invention has an advantage in that the plurality of switches connected to the primary side of the transformer may perform the zero-voltage switching using the magnetized inductance of the primary side to minimize the switching loss, and as the current flowing in the secondary side, the resonance current flows by the resonance inductor and the resonance capacitor to reduce the internal pressure of the diode connected to the secondary side. Further, the present invention has an advantage in that the low voltage DC/DC converter may be configured to more stably receive the fixed voltage, regardless of an output voltage variation of the high voltage battery.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. The drawings and description are to be regarded as illustrative in nature and not restrictive. Like reference numerals designate like elements throughout the specification. Throughout this specification and the claims that follow, when it is described that an element is "connected" to another element, the element may be "directly connected" to the other element or "electrically connected" to the other element through a third element.

Figure 1:
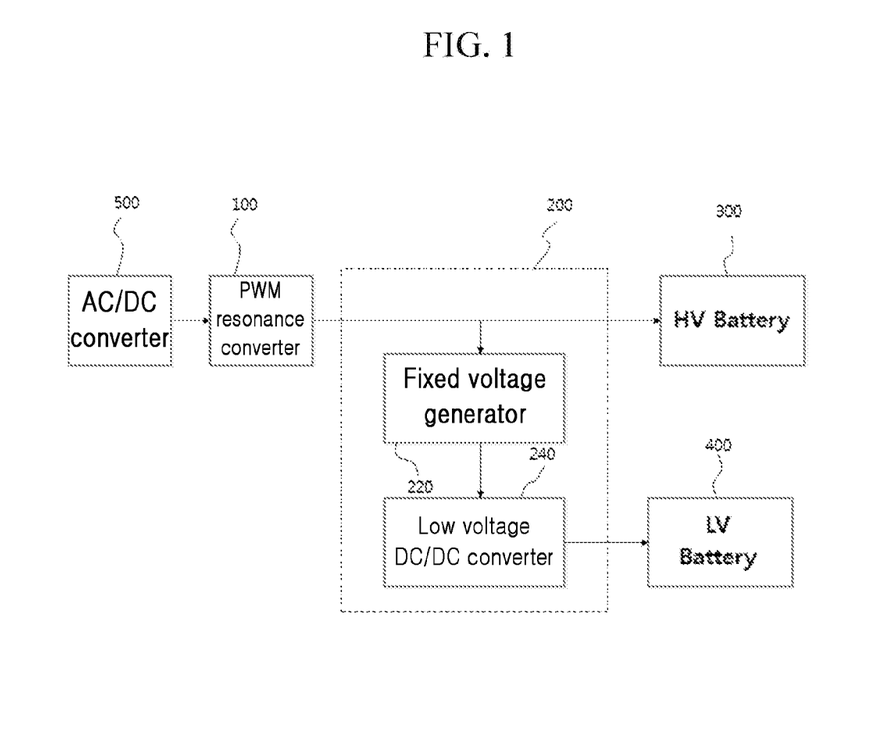
FIG. 1 is an exemplary diagram illustrating an EV charging system according to an exemplary embodiment of the present invention.

A charger for a vehicle to be described below exemplifies a charger for an EV, but the present invention is not limited thereto, and may be applied to chargers of all other vehicles that charge power in a battery, such as a plug-in hybrid vehicle. FIG. 1 is an exemplary diagram illustrating an EV charging system according to an exemplary embodiment of the present invention. As illustrated in FIG. 1, the EV charging system according to the exemplary embodiment of the present invention may include an AC/DC converter 500, a PWM resonance converter 100, a low voltage supply unit 200, a high voltage battery 300, and a low voltage battery 400.

In FIG. 1, the AC/DC converter 500, the PWM resonance converter 100, and the low voltage supply unit 200 may configure the charger for the vehicle according to the exemplary embodiment of the present invention. In FIG. 1, the high voltage battery 300 may be configured to supply power to a motor generator of the EV, and the low voltage battery 400 may be configured to supply the power to an electric field of the vehicle.

In FIG. 1, the AC/DC converter 500 may be configured to convert an input commercial AC voltage into a DC voltage, and in the exemplary embodiment of the present invention, the AC/DC converter 500 may be implemented as the PFC converter to improve a power factor by matching phases of an input voltage and an input current input through a rectified circuit (not illustrated). Such a PFC converter may be understood by those skilled in the art, and hereinafter, a detailed description thereof is omitted. Meanwhile, in the exemplary embodiment of the present invention, as the AC/DC converter, the PFC converter may be used, but the present invention is not limited thereto and other AC/DC converters may be used. Further, since the commercial AC voltage may be used as a power source for charging, the AC/DC converter 500 may be provided, but in the case of using not the commercial AC voltage but the DC voltage, the AC/DC converter 500 may not be used.

In FIG. 1, the PWM resonance converter 100 may be a converter configured to convert the DC voltage into a battery charging voltage of the high voltage battery 300 by adjusting a level of the DC voltage output from the AC/DC converter 500. According to the exemplary embodiment of the present invention, the PWM resonance converter 100 may be configured to convert the voltage and the current supplied according to a switching operation of a plurality of switches positioned at a primary side of the transformer to transfer the converted voltage and current to the secondary side. According to the exemplary embodiment of the present invention, the plurality of switches at the primary side may be configured to perform zero-voltage switching using a magnetized inductance, and a resonance current may flow in the secondary side.

In FIG. 1, the low voltage supply unit 200 may include a fixed voltage generator 220 and a low voltage DC/DC converter 240, and after an output voltage of the PWM resonance converter 100 or an output voltage of the high voltage battery 300 is generated as a fixed voltage, the fixed voltage may be stepped-down (e.g., reduced) as a required voltage through the adjustment of the duty ratio and the like and then the low voltage battery 400 may be charged at the stepped-down voltage (e.g., the reduced voltage or the decreased voltage).

In particular, the fixed voltage generator 220 may be configured to maintain the output voltage of the PWM resonance converter 100 and the output voltage of the high voltage battery 300 at a first fixed voltage, and supply the maintained fixed voltage to the low voltage DC/DC converter 240. The low voltage DC/DC converter 240 may be configured to convert the first fixed voltage output from the fixed voltage generator 220 into a second voltage through the adjustment of the duty ratio, and then the low voltage battery 400 may be charged at the converted second voltage.

Further, according to the exemplary embodiment of the present invention, the low voltage supply unit 200 may be configured to maintain the first fixed voltage based on the output voltage of the PWM resonance converter 100 when the vehicle to which the commercial power is supplied stops, and maintain the first fixed voltage based on the output voltage of the high voltage battery 300 while the vehicle is being driven. In addition, the maintained first fixed voltage may be reduced to a required second voltage through the adjustment of the duty ratio, and then the low voltage battery 400 may be charged at the reduced second voltage.

An existing low voltage DC/DC converter may be configured to directly receive the voltage from the high voltage battery, however since the output voltage of the high voltage battery may be changed according to a state of charge (SoC) of the high voltage battery, the voltage input to the low voltage DC/DC converter may change. However, according to the exemplary embodiment of the present invention, the low voltage DC/DC converter 240 may be configured to more stably receive the voltage through the fixed voltage generator 220 regardless of the output voltage change of the high voltage battery.

Figure 2:
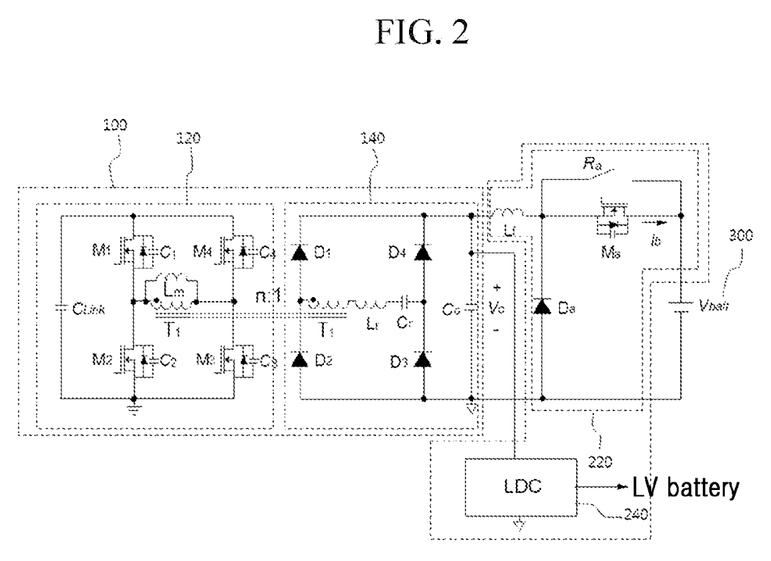
FIG. 2 is an exemplary diagram illustrating a PWM resonance converter and a low voltage supply unit according to the exemplary embodiment of the present invention.

Further, the PWM resonance converter 100 and the low voltage supply unit 200 according to the exemplary embodiment of the present invention will be described in more detail with reference to FIG. 2. As illustrated in FIG. 2, the PWM resonance converter 100 according to the exemplary embodiment of the present invention may include a switching unit 120, a transformer T1, and a rectifying unit 140.

The switching unit 120 may include a plurality of MOSFET switches M1, M2, M3, and M4 connected to the primary side of the transformer, and a DC voltage output from the AC/DC converter 500 may be converted to the AC voltage through the switching operation of each switch. At both ends of each of the plurality of MOSFET switches M1, M2, M3, and M4, capacitors C1, C2, C3, and C4 may be formed, and backward body diodes may be formed. Hereinafter, the capacitor formed at both ends of each switch is called a switch capacitor.

In particular, according to the exemplary embodiment of the present invention, as described below, since the plurality of switches may be configured to perform the zero-voltage switching using the magnetizing inductance of the primary side, the switching loss may be minimized. The transformer T1 may be configured to adjust a level of the AC voltage (hereinafter, referred to as a first AC voltage) generated by the switching operation of the switching unit 120. In other words, the transformer T1 may be configured to adjust the level of the current (corresponding to the first AC voltage) transferred from the switching unit 120 to transfer the current from the primary side to the secondary side. The level of the current may be determined according to a ratio of wound numbers of coils at the primary side and the secondary side. Additionally, the rectifying unit 140 may include bridge diodes D1, D2, D3, and D4, a resonance inductor Lr connected to the secondary side of the transformer, a resonance capacitor Cr, and an output capacitor C0. The resonance inductor Lr and the resonance capacitor Cr constitute a resonance tank.

In FIG. 2, the resonance tank Lr and Cr may be connected between a contact point of the diodes D1 and D2 connected to one end (e.g., a first end) of the secondary side coil of the transformer and a contact point of the diodes D3 and D4 connected to the other end (e.g., a second end) of the secondary side coil of the transformer in series, and makes the resonance of the current (voltage) transferred from the primary side to the secondary side. Accordingly, since the resonance tank generating a resonance current is provided at the secondary side, the internal pressure of the diode connected to the secondary side may be reduced. In FIG. 2, an output capacitor Co may be configured to generate the output voltage output from the high voltage battery 300 by charging the current rectified through the bridge diode.

Meanwhile, as illustrated in FIG. 2, the fixed voltage generator 220 according to the exemplary embodiment of the present invention may include an output inductor Lf, a first switch Ma, a diode Da, and a second switch Ra. In the exemplary embodiment of the present invention, the first switch Ma may be constituted by a MOSFET, and the second switch Ra may be constituted by a MOSFET. Further, the output inductor Lf and the first switch Ma and the diode Da may constitute a buck DC/DC converter.

In FIG. 2, the output inductor Lf may be connected to the output terminal of the PWM resonance converter 100 to stabilize the voltage input to the low voltage DC/DC converter 240. The second switch Ra is a switch that may be configured to select whether to charge the high voltage battery 300 (high voltage charging mode) or charge the low voltage battery 400 (low voltage charging mode) by the output voltage of the PWM resonance converter 100. In the exemplary embodiment of the present invention, when a charging mode is selected using the second switch Ra which is a relay switch, the relay element may have a lower switching loss than the MOSFET switch, and as a result, may be advantageous in terms of power.

The diode Da and the first switch Ma may operate as the Buck DC/DC converter in a low voltage charging mode, and may not operate in a high voltage charging mode. In particular, according to the exemplary embodiment of the present invention, in the high voltage charging mode, the second switch Ra may be turned on and then the high voltage battery 300 may be charged using the output voltage Vo of the PWM resonance converter 100. In addition, in the low voltage charging mode, the second switch Ra may be turned off and then the first switch Ma and the diode Da may operate as the buck DD/DC converter to maintain the output voltage of the PWM resonance converter 100 or the output voltage of the high voltage battery at the fixed voltage Vo. Since the operation of the buck DC/DC converter may be understood by those skilled in the art, hereinafter, the detailed description is omitted.

Meanwhile, in the exemplary embodiment of the present invention, the fixed voltage generator 200 may be implemented using the buck DC/DC converter, but the present invention is not limited thereto, and other DC/DC converters other than the buck DC/DC converter may be used. Further, in the exemplary embodiment of the present invention, whether to charge the high voltage battery 300 (high voltage charging mode) or charge the low voltage battery 400 (low voltage charging mode) by the output voltage of the PWM resonance converter 100 may be selected using the second switch Ra which is the relay switch, but the charging mode may be selected by removing the second switch and using the first switch used as the buck DC/DC converter. In other words, in the high voltage battery charging mode, the first switch may be maintained in an on state, and in the low voltage battery charging mode, the first switch may be switched to operate as the buck DC/DC converter. Accordingly, when the charging mode is selected by removing the second switch and integrally using the first switch which is the MOSFET, the overall number of components may be reduced.

As described above, according to the exemplary embodiment of the present invention, the low voltage DC/DC converter 240 may more stably receive the fixed voltage through the fixed voltage generator 220 regardless of the changed voltage of the high voltage battery. Hereinafter, an operation of the PWM resonance converter 100 according to the exemplary embodiment of the present invention will be described with reference to FIGS. 3 to 10.

Mode 1

Figure 3:
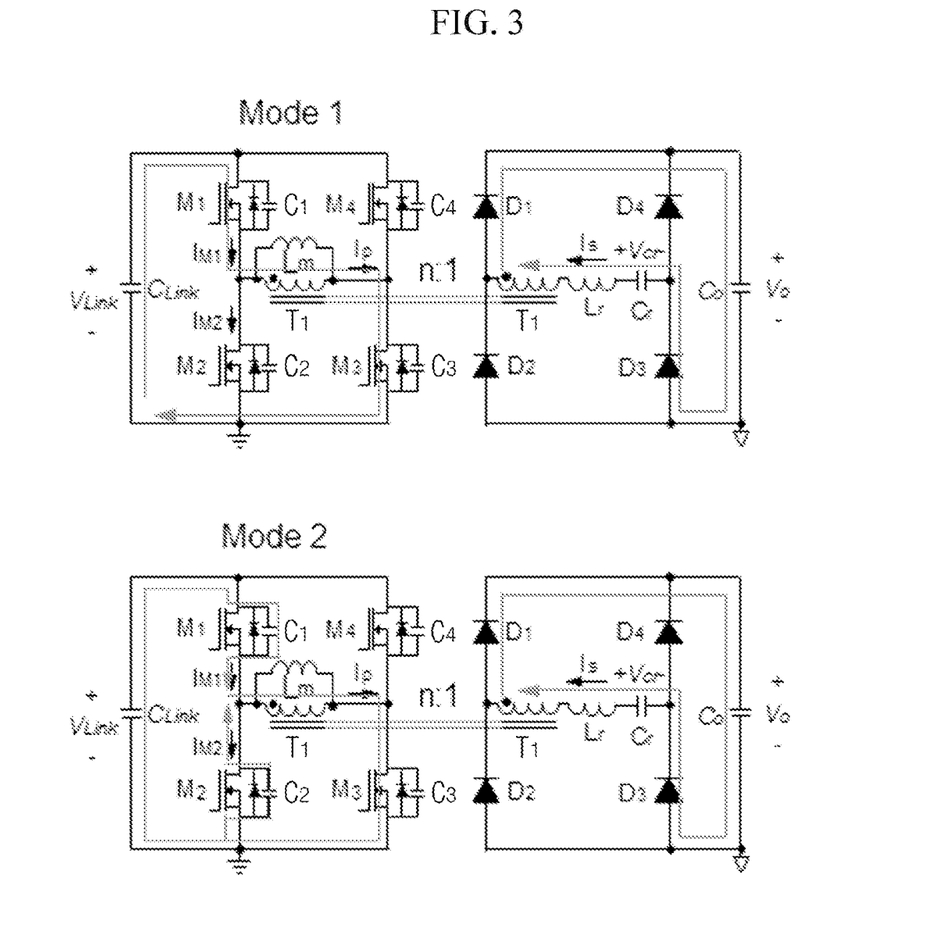
FIGS. 3 to 10 are exemplary diagrams illustrating an operation of the PWM resonance converter according to the exemplary embodiment of the present invention.
Figure 4:
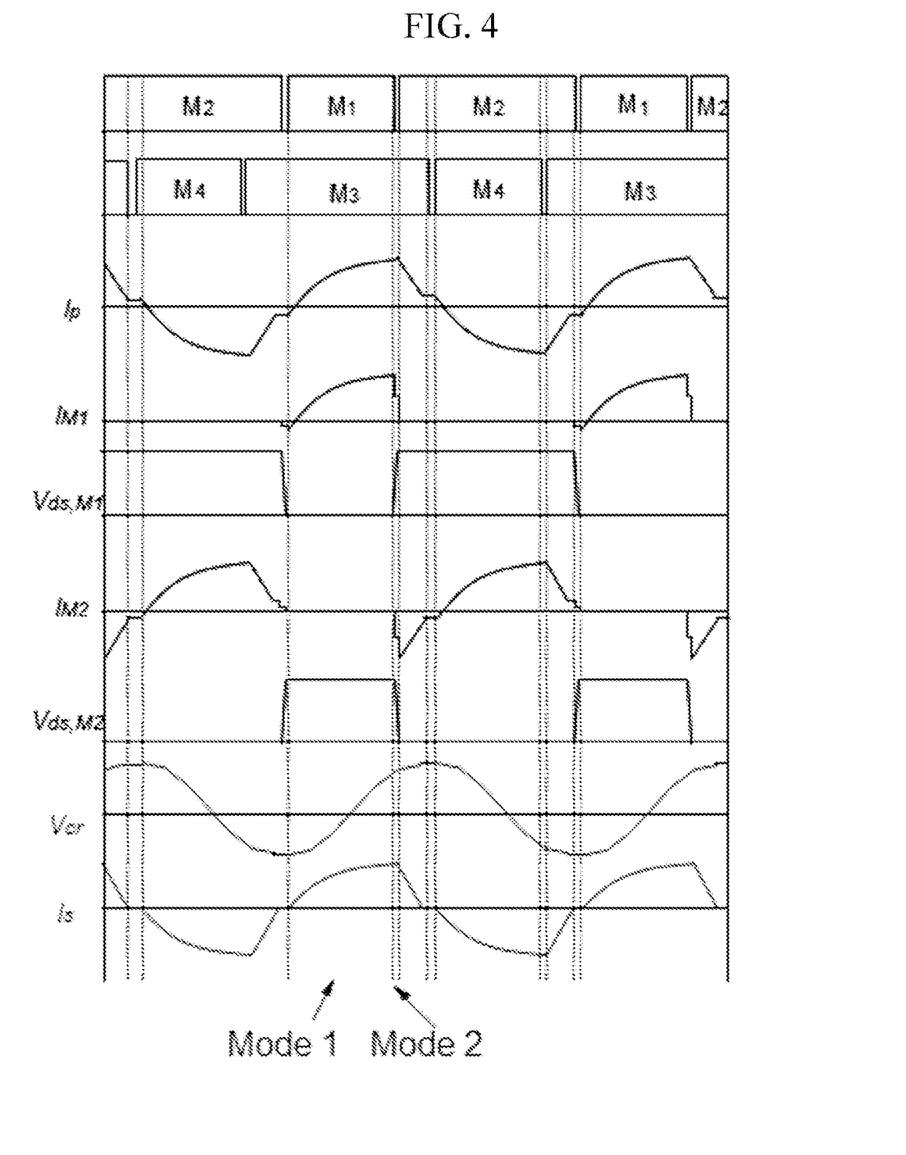

As illustrated in FIGS. 3 and 4, in Mode 1, a switch M1 may be switched from an off state to an on state, a switch M3 may be in the on state, and a switch M2 and a switch M4 may be maintained in the off state. When the switch M1 and the switch M3 are turned on, a primary current Ip of the transformer may flow on a path of a capacitor Clink in which the output voltage of the AC/DC converter 500 is charged, the switch M1, a primary coil Lm of the transformer, and the switch M2, and a secondary current ls of the transformer may flow on a path of a diode D1, a capacitor Co in which the output voltage of the PWM resonance converter is charged, the diode D3, the resonance capacitor Cr, the resonance inductor Lr, and a secondary coil Lr of the transformer. In particular, the current ls flowing in the secondary side of the transformer may flow in a resonance form due to the resonance inductor Lr and the resonance capacitor Cr.

In Mode 1, the voltage may not be charged in the capacitor C1 of the switch M1, and a voltage Vlink charged in the capacitor Clink may be charged in the capacitor C2 of the switch M2.

Mode 2

As illustrated in FIGS. 3 and 4, in Mode 2, the switch M1 may be switched from an on state to an off state, the switch M3 may be in the on state, and the switch M2 and the switch M4 may be maintained in the off state.

When the switch M1 is switched from the on state to the off state, the primary current Ip may charge the capacitor C1 of the switch M1 up to the voltage Vlink, and the capacitor C2 of the switch M2 may be discharged up to about 0. In this state, thereafter, when the switch M2 is turned on, zero-voltage switching of the switch M2 may be achieved. As illustrated in FIG. 4, an operation period of Mode 2 may be maintained for less amount of time than an operation period of Mode 1.

Mode 3

Figure 5:
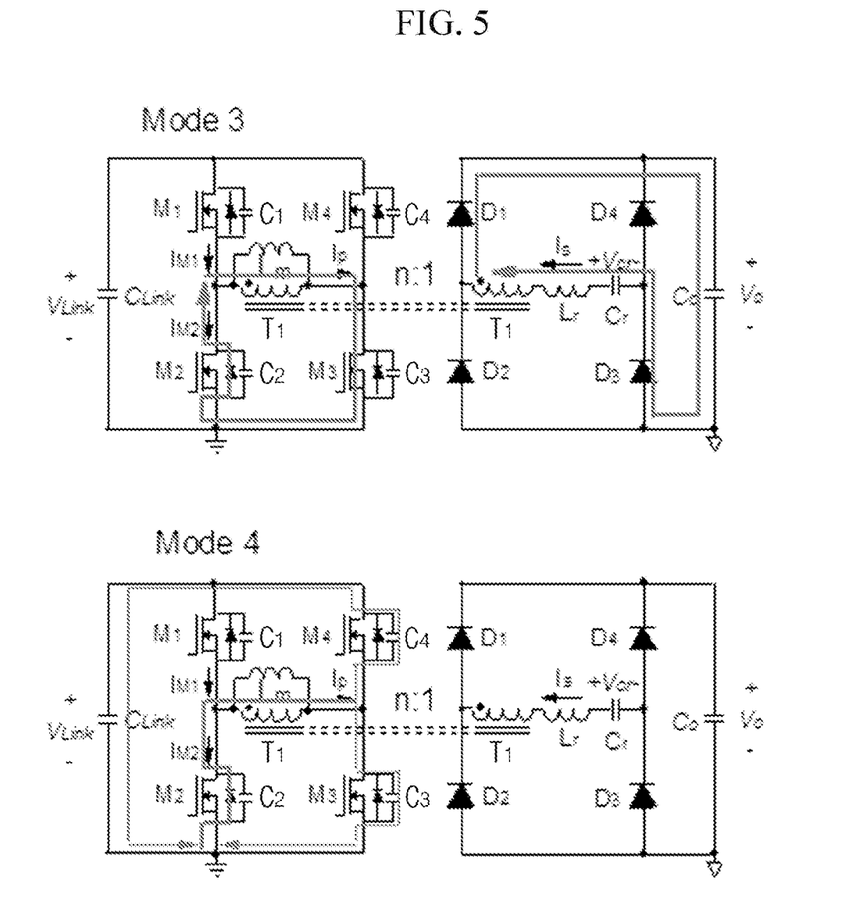
Figure 6:
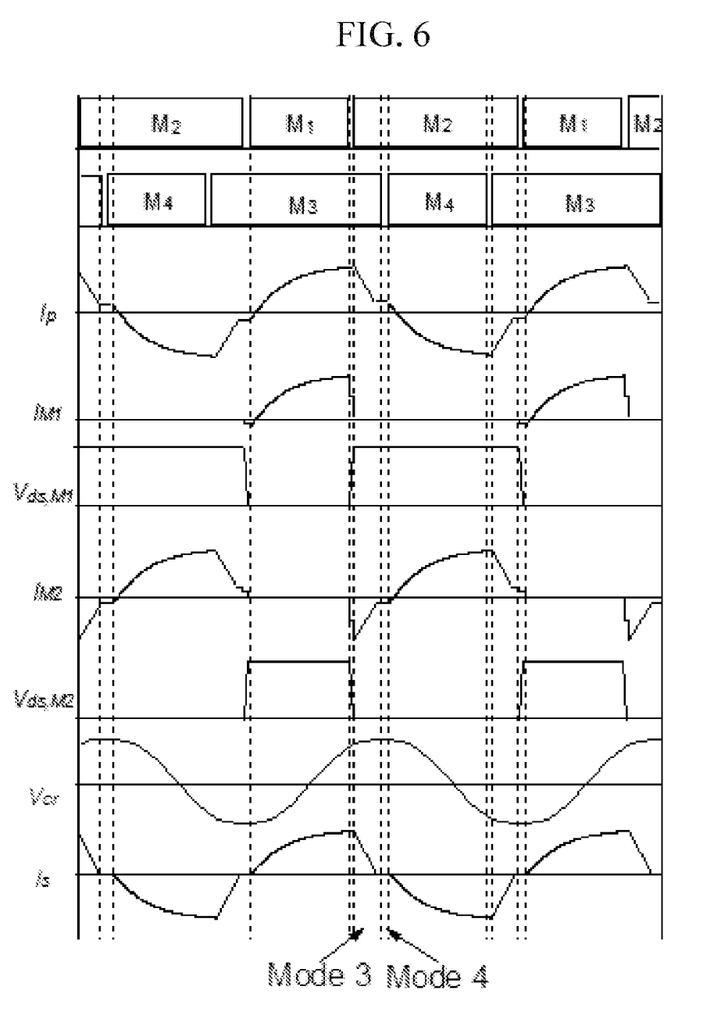

As illustrated in FIGS. 5 and 6, in Mode 3, the switch M2 may be switched from the off state to the on state, the switch M3 may be in the on state, and the switch M1 and the switch M4 may be maintained in the off state. In Mode 2, since a difference in voltage between both ends of the capacitor C2 of the switch M2 may be about 0, when the switch M2 is switched from the off state to the on state, the zero-voltage switching may be achieved, thereby minimizing the switching loss.

For a Mode 3 period, since the switch M2 and the switch M3 may be turned on, the voltage of the both ends of the transformer may be about 0, and the secondary current ls may flow on a path of the resonance capacitor Cr, the resonance inductor Lr, the secondary coil, the diode D1, and the diode D3, and an amplitude of the current may be gradually decreased. In this period, when the secondary current ls is about 0, a magnetized current lm may be present at the primary side of the transformer.

Mode 4 As illustrated in FIGS. 5 and 6, in Mode 4, the switch M3 may be switched from the on state to the off state, the switch M2 may be in the on state, and the switch M1 and the switch M4 may be maintained in the off state.

When the switch M3 is switched from the on state to the off state, the magnetized current lm flowing in an inductor of the primary transformer may charge the capacitor C3 of the switch M3 up to Vlink, and discharge the capacitor C4 of the switch M4 up to about 0. In this state, thereafter, when the switch M4 is turned on, the zero-voltage switching of the switch M4 may be achieved. As illustrated in FIG. 6, an operation period of Mode 4 may be maintained for a less amount of time than the operation period of Mode 3.

Mode 5

Figure 7:
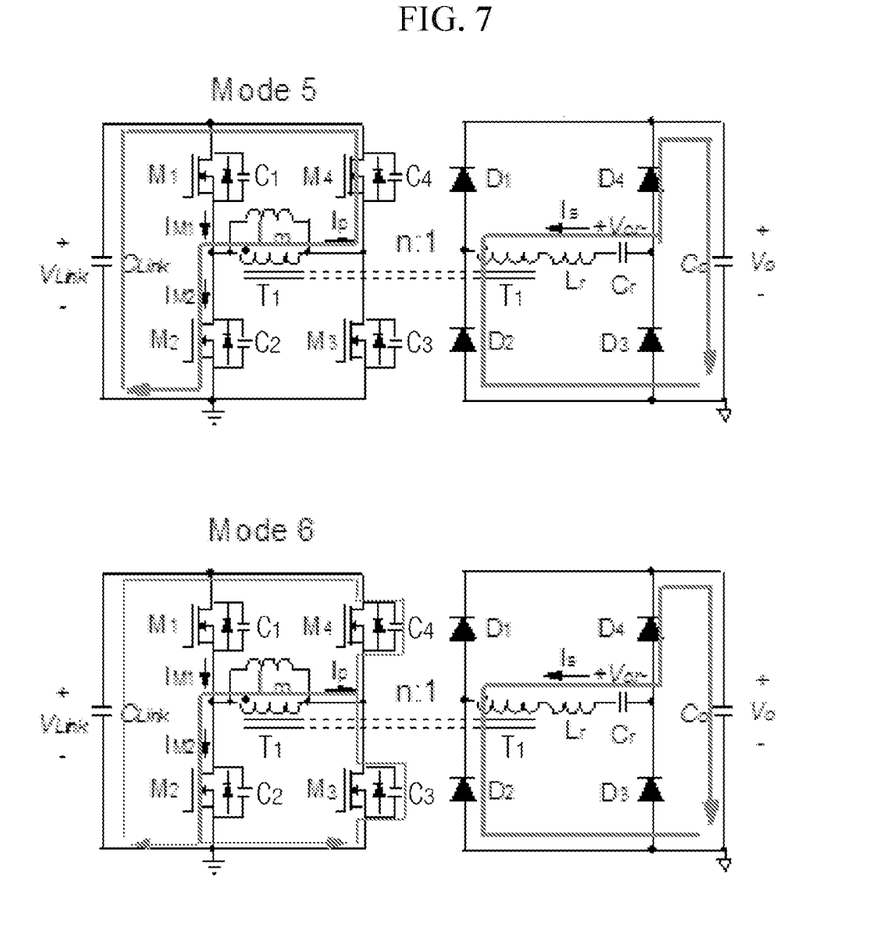
Figure 8:
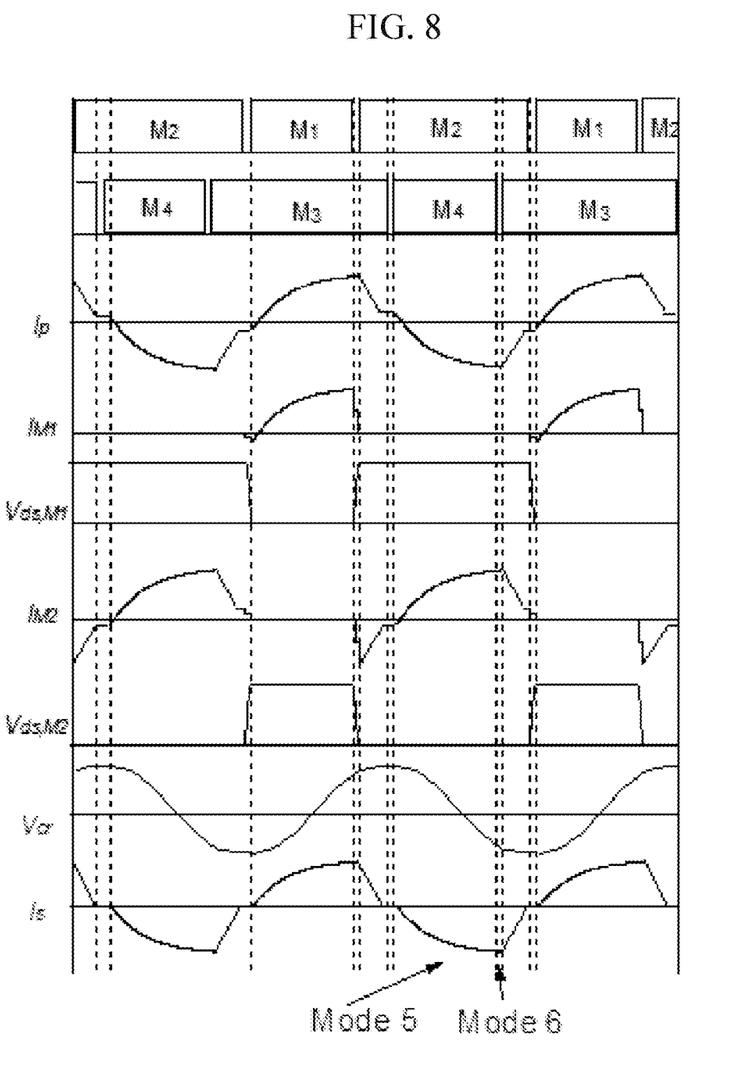

As illustrated in FIGS. 7 and 8, in Mode 5, the switch M4 may be switched from the off state to the on state, the switch M2 may be in the on state, and the switch M1 and the switch M4 may be maintained in the off state. In Mode 4, since a difference in voltage between both ends of the capacitor C4 of the switch M4 may be about 0, when the switch M4 is switched from the off state to the on state, the zero-voltage switching may be achieved, thereby minimizing the switching loss.

For a Mode 5 period, since the switch M2 and the switch M4 are turned on, the primary current Ip may flow on a path of the capacitor Clink, the switch M4, the primary coil Lm of the transformer, and the switch M2, and the secondary current Is may flow on a path of the diode D2, the secondary coil of the transformer, the resonance inductor Lr, the resonance capacitor Cr, the diode D4, and the output capacitor Co. In this case, the current Is flowing in the secondary side of the transformer may flow in a resonance form by the resonance inductor Lr and the resonance capacitor Cr.

Mode 6

As illustrated in FIGS. 7 and 8, in Mode 6, the switch M4 may be switched from the on state to the off state, the switch M2 may be in the on state, and the switch M1 and the switch M3 may be maintained in the off state.

When the switch M4 is switched from the on state to the off state, the magnetized current lm flowing in an inductor of the primary transformer may charge the capacitor C4 of the switch M4 up to Vlink, and discharge the capacitor C3 of the switch M3 up to about 0. In this state, thereafter, when the switch M3 is turned on, the zero-voltage switching of the switch M3 may be achieved. As illustrated in FIG. 8, an operation period of Mode 6 may be maintained for a less amount of time than the operation period of Mode 5.

Mode 7

Figure 9:
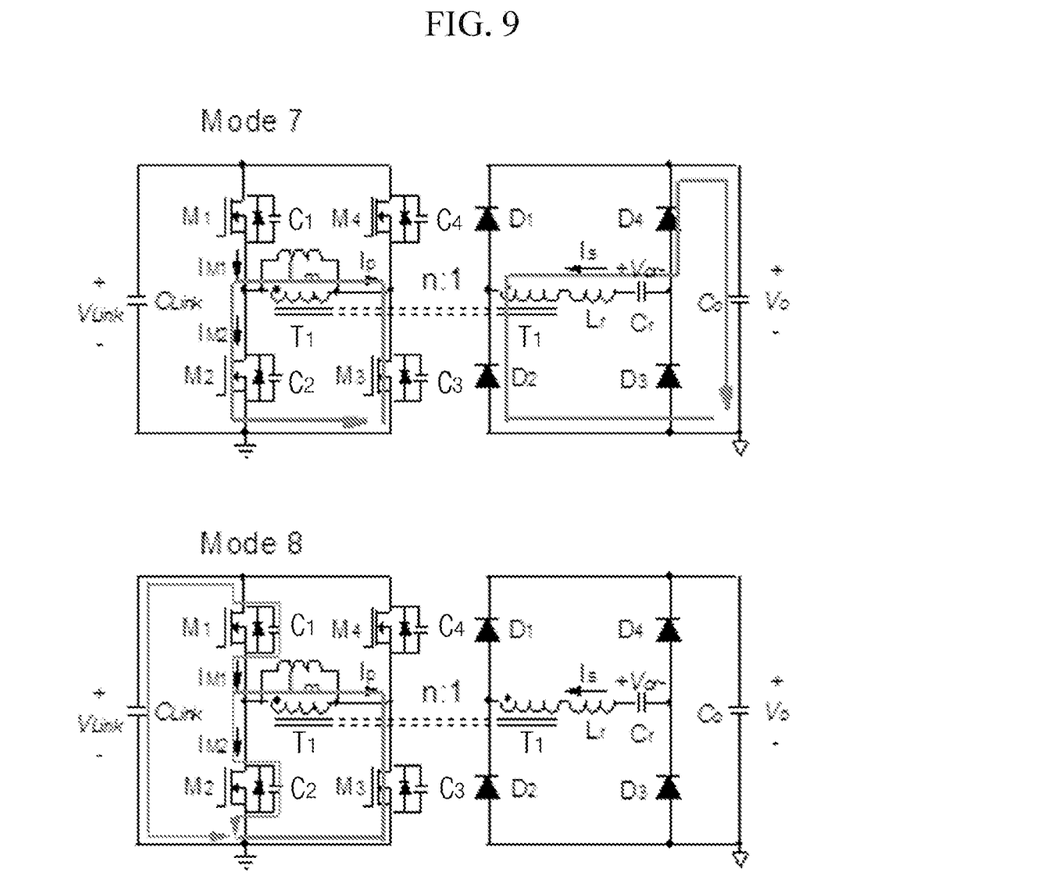
Figure 10:
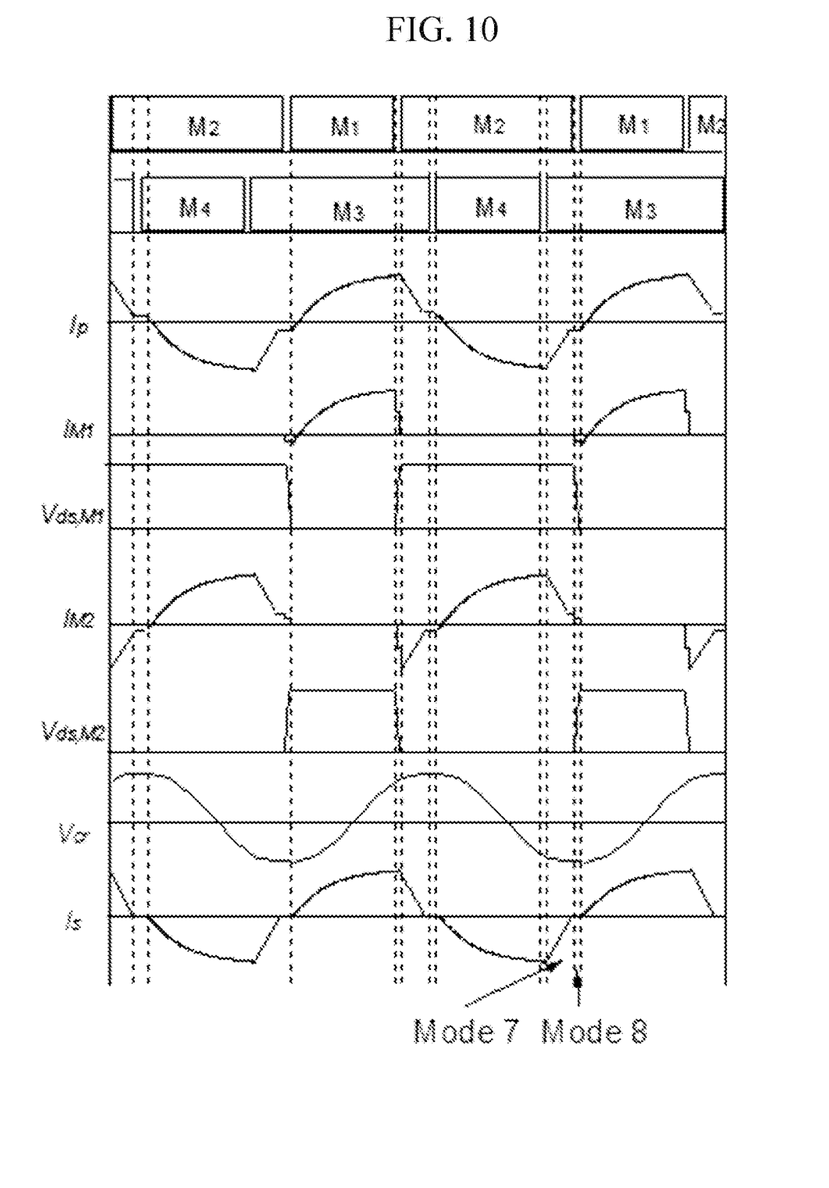

As illustrated in FIGS. 9 and 10, in Mode 7, the switch M3 may be switched from the off state to the on state, the switch M2 may be in the on state, and the switch M1 and the switch M4 may be maintained in the off state. In mode 6, since a difference in voltage between both ends of the capacitor C3 of the switch M3 may be about 0, when the switch M3 is switched from the off state to the on state, the zero-voltage switching may be achieved, thereby minimizing the switching loss.

For a Mode 7 period, since the switch M2 and the switch M3 are turned on, the voltage of both ends of the transformer may be about 0, and the secondary current lr may flow on a path of the resonance inductor Lr, the resonance capacitor Cr, the diode D4, the diode D2, and the secondary coil of the transformer, and an amplitude of the current may be gradually decreased. In this period, when the secondary current Is is about 0, only a magnetized current lm may be present at the primary side of the transformer.

Mode 8

As illustrated in FIGS. 9 and 10, in Mode 8, the switch M2 may be switched from the on state to the off state, the switch M3 may be maintained in the on state, and the switch M1 and the switch M4 may be maintained in the off state.

When the switch M2 is switched from the on state to the off state, the magnetized current lm flowing in an inductor of the primary transformer may charge the capacitor C2 of the switch M2 up to Vlink, and discharge the capacitor C1 of the switch M1 up to about 0. In this state, thereafter, when the switch M1 is turned on, the zero-voltage switching of the switch M1 may be achieved. As illustrated in FIG. 10, an operation period of Mode 8 may be maintained for a less amount of time than the operation period of Model.

Accordingly, the PWM resonance converter 100 according to the exemplary embodiment of the present invention has an advantage in that the plurality of switches M1, M2, M3, and M4 connected to the primary side of the transformer may be configured to perform the zero-voltage switching using the magnetized inductance of the primary side to minimize the switching loss, and as the current flowing in the secondary side, the resonance current may flow by the resonance inductor and the resonance capacitor to reduce the internal pressure of the diode connected to the secondary side.

In particular, for a circuit having an inductor in the output like an existing phase shift full bridge (PSFB) circuit, due to the leakage of the transformer and the resonance by a parasitic capacitor of the diode, the internal pressure of the diode maybe increased, but according to the exemplary embodiment of the present invention, since the resonance mode by the resonance inductor and the resonance capacitor formed at the secondary side may be used, the inductor may not be required in the output, and as a result, the voltage of the diode may be clamped as the output voltage to maintain an internal pressure lower than that of the PSFB.

Further, according to the exemplary embodiment of the present invention, since the path of the magnetized current generated at the primary side and the path of the resonance current by the resonance inductor and the resonance capacitor formed at the secondary side may be independent, the magnetized current at the primary side may not be influenced by the resonance capacitor voltage of the secondary side.

Figure 11:
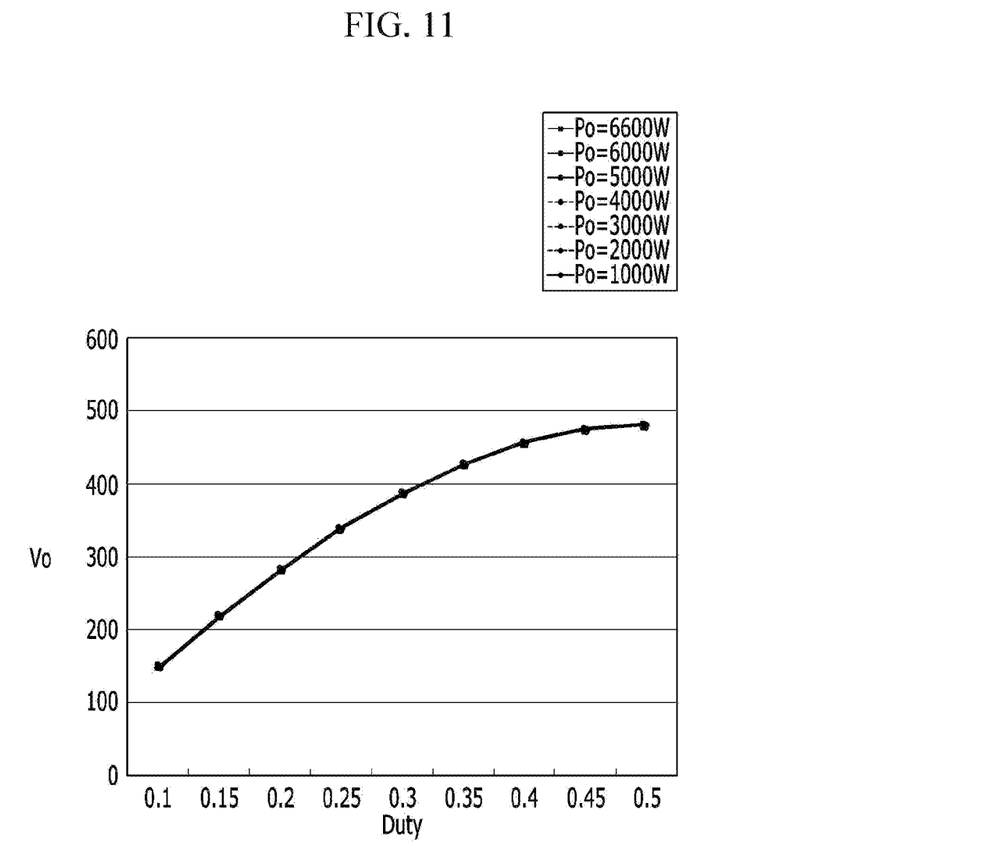
FIGS. 11 and 12 are exemplary diagrams illustrating a simulation result according to the exemplary embodiment of the present invention.
Figure 12:
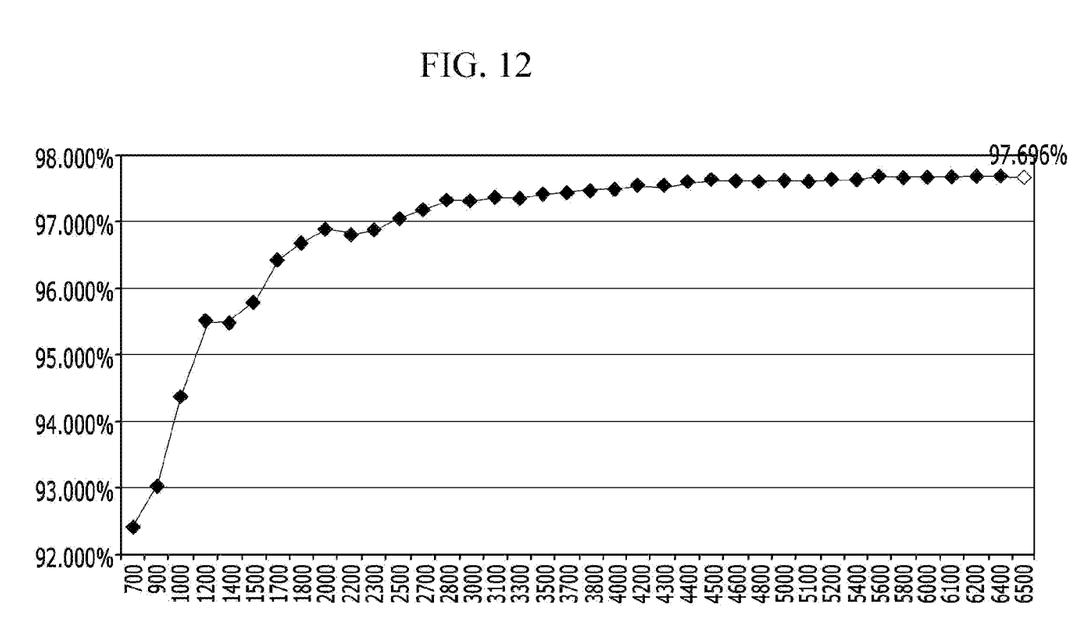

FIGS. 11 and 12 are exemplary diagrams illustrating a simulation result according to the exemplary embodiment of the present invention. The graphs illustrated in FIGS. 11 and 12 represent an input/output relationship of when the inductance of the inductor Lm by the primary coil of the transformer in the circuit illustrated in FIG. 2 of about 256 uH, the inductance of the resonance inductor Lr of about 28.6 uH, and the capacitance of the resonance capacitor Cr of about 400 nF are set, and show minimal variation in gain according to the load, and the output may be controlled by a duty ratio. Further, the graphs illustrate that as an efficiency measurement result, high efficiency of about 97% or greater may be achieved.

In the exemplary embodiment of the present invention described above, a PWM resonance converter and the charger using the same are used in the vehicle charger is described as an example, but the present invention is not limited thereto, and may be used for other various devices.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

100 PWM resonance converter
200 Low voltage supply unit
300 High voltage battery
400 Low voltage battery
220 Fixed voltage generator
240 Low voltage DC/DC converter
120 Switching unit
140 Rectifying unit

What is claimed is:

1. A charger for a vehicle that charges a high voltage battery supplying power to a motor generator of the vehicle and a low voltage battery supplying the power to an electric field of the vehicle, the charger comprising:
   an alternating current-direct current (AC/DC) converter configured to convert an input AC voltage into a DC voltage;
   a first converter including a plurality of switches formed at a primary side of a transformer, and a resonance inductor and a resonance capacitor formed at a secondary side of the transformer, and configured to generate a first voltage for charging the high voltage battery by adjusting a level of a DC voltage output from the AC/DC converter; and a low voltage supply unit configured to generate a second voltage to maintain an output voltage of the first converter or an output voltage of the high voltage battery at a first fixed voltage and to charge the low voltage battery by reducing the output voltage based on the first fixed voltage, wherein the low voltage supply unit includes:

a fixed voltage generator configured to maintain the output voltage of the first converter or the output voltage of the high voltage battery at the first fixed voltage, wherein the fixed voltage generator includes an inductor electrically connected to the output terminal of the first converter; and a low voltage DC/DC converter configured to charge the low voltage battery by the second voltage, after converting the first fixed voltage output from the fixed voltage generator into the second voltage by adjusting a duty ratio, and wherein the fixed voltage generator includes:

a first switch electrically connected to an output terminal of the first converter and a first end of the high voltage battery;

a diode electrically connected to the first switch and a second end of the high voltage battery; and an inductor electrically connected to the output terminal of the first converter and the first end of the high voltage battery.

2. The charger of claim 1, wherein:

in a first mode in which the high voltage battery is charged, the first switch is in an on state, and in a second mode in which the low voltage battery is charged, the first switch, the diode, and the inductor operate as a buck DC/DC converter.

3. The charger of claim 1, wherein the fixed voltage generator further includes:

a second switch connected to the first switch in parallel and electrically connected to the output terminal of the first converter and the first end of the high voltage battery.

4. The charger of claim 3, wherein:

in the first mode in which the high voltage battery is charged, the second switch is in an on state, and in the second mode in which the low voltage battery is charged, the second switch is in an off state, and the first switch, the diode, and the inductor operate as a buck DC/DC converter.

5. The charger of claim 4, wherein the first switch is an MOSFET, and the second switch is a relay.

6. The charger of claim 5, wherein the low voltage supply unit is configured to maintain the first fixed voltage based on the output voltage of the first converter while the vehicle is stopped, and maintain the first fixed voltage based on the output voltage of the high voltage battery while the vehicle is traveling.

7. The charger of claim 5, wherein the first converter includes:

a transformer;

a switching unit that includes first to fourth switches electrically connected to a primary coil of the transformer and configured to convert a DC voltage into an AC voltage by a switching operation of the first to fourth switches in which each switch is switched from an off state to an on state when a voltage difference between both ends is about 0; and a rectifying unit including first to fourth diodes electrically connected to a secondary coil of the transformer, a resonance tank having a resonance capacitor and a resonance inductor which are electrically connected to the secondary coil of the transformer, and an output capacitor.

8. The charger of claim 7, wherein:

a first end of the secondary coil of the transformer is electrically connected to a contact point of the first and second diodes, the resonance tank is electrically connected between a second end of the secondary coil of the transformer and a contact point of the third and fourth diodes, and the output capacitor is electrically connected between the contact point of the first and fourth diodes and the contact point of the second and third diodes.

9. The charger of claim 8, wherein:

a first end of the primary coil of the transformer is electrically connected to a contact point of the first and second switches connected to each other in series, a second end of the primary coil of the transformer is electrically connected to a contact point of the third and fourth switches connected to each other in series, and an input capacitor is electrically connected between the first switch and the second switch.

* * * * *